Patented Apr. 5, 1932

1,852,183

UNITED STATES PATENT OFFICE

GEORGE E. MILLER AND SAMUEL C. WITHERSPOON, OF EDGEWOOD, MARYLAND

PROCESS FOR PREPARING ARSENIC TRICHLORIDE

No Drawing.    Application filed September 25, 1928.    Serial No. 308,334.

(GRANTED UNDER THE ACT OF MARCH 3, 1883, AS AMENDED APRIL 30, 1928; 370 O. G. 757)

This invention described herein may be manufactured and used by or for the Government for Government purposes, without payment to us of any royalty thereon.

This invention relates in general to a method of preparing arsenic compounds, and more particularly has reference to a process for forming arsenic tri-chloride.

Previous to this time, arsenic tri-chloride has been prepared by treating arsenic tri-oxide with hydrochloric acid, a process in which a dehydration operation is essential, and also by heating arsenic tri-oxide with sulphur mono-chloride, in which it is necessary to prepare the sulphur chloride in a separate step. When this reaction reaches completion the major portion of the sulphur, added as sulphur chloride, remains in the reactor as free sulphur. This reaction takes place in accordance with the following equation:

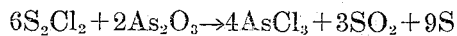

In the above outlined process the sulphur chloride is first prepared in a separate operation as previously described, and the free sulphur left from the reaction must be chlorinated for further use as sulphur chloride.

An object of this invention is to provide a method of preparing arsenic tri-chloride.

Another object of this invention is to provide a method of preparing arsenic tri-chloride in which the reaction proceeds quantitatively.

A further object of this invention is to provide a process of preparing arsenic tri-chloride in which the anhydrous compound is formed in a single operation.

With these and other objects in view which may be incident to these improvements, the invention consists in the method of preparing arsenic tri-chloride to be hereinafter set forth and claimed, with an understanding that the several necessary steps comprising the invention may be accomplished in any other order found most suitable for carrying the same into practical effect, and it is apparent that the certain compound and elements may be substituted for those enumerated and similar formations effected without limiting the invention within the scope of the appended claims.

The process forming the subject matter of this invention consists essentially in the preparation of arsenic tri-chloride, by the chlorination of arsenic tri-oxide to form arsenic tri-chloride, using sulphur as a dioxidizing agent and arsenic tri-chloride as a solvent.

In preparing arsenic tri-chloride according to this invention, sulphur and arsenic tri-oxide are combined either in suspension in a liquid or in a solution so that intimate contact with chlorine may be obtained. It is preferred that the sulphur and arsenic tri-oxide be put in solution in arsenic tri-chloride. If a sufficient quantity of arsenic tri-chloride to dissolve the arsenic tri-oxide and sulphur is employed, and the solution is heated to the boiling point of the arsenic tri-chloride and chlorine is passed into the mix, the formation of arsenic tri-chloride takes place.

When chlorine is passed into the solution or suspension of arsenic tri-oxide and sulphur in arsenic tri-chloride, and the solution is heated to the boiling point of the arsenic tri-chloride, the chlorine reacts with the sulphur to form sulphur chloride, which in turn reacts with the arsenic tri-oxide to form arsenic tri-chloride. By properly regulating the proportion of the reactants, no residue is left after the distilling of the arsenic tri-chloride. The reaction forming the subject matter of this invention may be expressed by the following equation:

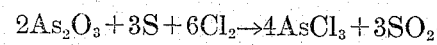

In carrying out this process it is preferred to use the following proportions of arsenic tri-oxide, sulphur, and arsenic tri-chloride:

606 parts by weight arsenic tri-oxide,
134 parts by weight sulphur,
772 parts by weight arsenic tri-chloride.

The yields of arsenic tri-chloride which may be obtained by this method equal approximately the theoretical maximum and the product obtained is completely anhydrous and contains but an unappreciable amount of sulphur. In this process free chlorine, sulphur and arsenic tri-oxide are made to combine in one operation with the production of arsenic tri-chloride, obviating the necessity of rechlorinating residual sulphur produced by the old reaction.

There is accomplished by this invention a process of making arsenic tri-chloride in a single operation by the chlorination of arsenic tri-oxide with chlorine, using sulphur as a deoxidizing agent and arsenic tri-chloride as a solvent in which no appreciable quantity of residual sulphur remains, and the product is obtained directly in an anhydrous condition.

While we have shown and described the preferred embodiment of our invention, we wish it to be understood that we do not confine ourselves to the precise details of the process herein set forth, by way of understanding, as it is apparent that many changes and variations may be made therein, by those skilled in the art, without departing from the spirit of the invention, or exceeding the scope of the appended claims.

We claim as our invention:

1. A method of preparing arsenic tri-chloride comprising combining arsenic tri-oxide and sulphur in solution with arsenic tri-chloride, heating the solution to the boiling point of the arsenic tri-chloride and chlorinating the mix.

2. A method of preparing arsenic trichloride comprising combining arsenic trioxide and sulphur in solution with arsenic trichloride, heating to the boiling point of arsenic trichloride passing chlorine into the solution and distilling off arsenic trichloride.

In testimony whereof we affix our signatures.

GEORGE E. MILLER.
SAMUEL C. WITHERSPOON.